May 22, 1928.

H. BRYAN ET AL 1,670,711

SPRAYING DEVICE

Filed April 13, 1927

WITNESSES
John P. Woodworth
Johnson McFetridge

INVENTORS
HARRY BRYAN
WILLIAM H. ROSS
J. RICHARD ADAMS

ATTORNEYS

Patented May 22, 1928.

1,670,711

UNITED STATES PATENT OFFICE.

HARRY BRYAN, WILLIAM H. ROSS, AND JAMES RICHARD ADAMS, OF WASHINGTON, DISTRICT OF COLUMBIA, ASSIGNORS TO THE GOVERNMENT AND THE PEOPLE OF THE UNITED STATES OF AMERICA.

SPRAYING DEVICE.

Application filed April 13, 1927. Serial No. 183,524.

(GRANTED UNDER THE PROVISIONS OF THE ACT OF MARCH 3, 1883, 22 STAT. L., 625.)

This application is made under the act of March 3. 1883. chapter 143 (22 Stat. 625) and the invention herein described and claimed may be used by the Government of the United States or any of its officers or employees in the prosecution of work for the Government, or by any citizen of the United States, without payment to us of any royalty thereon.

Commercial fertilizers as now manufactured consist of mixtures of inorganic salts and of various organic wastes such as cotton seed meal, tankage and fish scrap. These organic materials are admirably suited for use in fertilizers in that they not only serve as important sources of plant food but they also greatly improve the physical condition of the mixture in which they are included. The supply of these materials is not sufficient, however, to meet the demand and the proportion in which they now occur in fertilizers is estimated to be only about half as great as a few years ago. With a view to supplying this deficiency in nitrogenous materials a great deal of attention is now being given to the synthesis of such nitrogen compounds as calcium nitrate, urea and ammonium nitrate.

From a chemical point of view, these materials are particularly well adapted for use as fertilizers. They together contain the three forms of nitrogen—ammonia, nitrate and organic—which are considered desirable in all mixed fertilizers; they leave no accumulation of toxic residues in the soil; and all contain nitrogen in a readily available form.

It unfortunately happens, however, that these salts are all hygroscopic and readily absorb moisture from the air at humidities which commonly prevail in humid countries. This property greatly interferes with their use in fertilizers in that it causes the mixture in which they are included to become sticky and cake. The principal cause of caking in salts of this kind is due to a knitting together of the crystals by the successive absorption and loss of moisture when the humidity of the air alternately rises above and then falls below that corresponding to the vapor pressure of their saturated solutions. The rate at which setting occurs will necessarily vary greatly with the mechanical condition of the material and will be most pronounced in products which are finely ground. In this condition the points of contact between the individual particles are at a maximum, the surface area of the material is relatively large, the force of adhesion acting between the very fine particles is considerable, and a secondary knitting occurs through the growth of the larger crystals at the expense of the smaller crystals. This exchange of crystal growth is due to the difference in solubility of crystal particles which differ in size as necessarily occurs in all materials that have been pulverized by grinding.

We have found that the physical condition of a fertilizer material may be greatly improved when it is prepared in the form of spherical balls or grains of uniform size. In this condition the surface area of the material is greatly reduced, the points of contact between the individual particles are at a minimum, the force of adhesion no longer plays an effective role and secondary caking which depends on wide variations in the size of the particles is entirely prevented.

The granulation of a fertilizer material in the form of spherical balls or grains gives it the further distinctive property of readily flowing through an orifice or through the adjustable openings in a fertilizer drilling or distributing machine.

In the preparation of urea from ammonia and carbon dioxide the liquefied gases are compressed into an autoclave at about 100 atmospheres and 135° C., and the resultant liquid product allowed to discharge through a relief valve at the top of the autoclave into a fractionating column to separate the uncombined ammonia and carbon dioxide from the solution of urea which is formed in the process. The latter is then concentrated in a vacuum evaporator and the molten product finally drawn off through a suitable opening in the bottom. As the urea cools it forms a hard mass which is very difficult to grind, except in very dry weather, owing to its hydroscopic nature.

In the operation of our process the molten product is dicharged from the evaporator through a nozzle of special design which divides it into a spray of small droplets under such conditions that the droplets congeal to solid spheres before reaching the bottom of the spraying chamber. The necessity for subsequent crushing or grinding of the urea is thus avoided.

The object of our invention is thus to provide a simple and efficient method for treating a fusible fertilizer material, such as urea, which treatment will at the same time decrease its tendency to cake, increase its drillability and reduce the cost of manufacture.

In the accompanying drawings there is shown one embodiment of an apparatus for carrying out the process of our invention.

Fig. 1 is a vertical sectional view through the spraying chamber and the compartment above the chamber in which the evaporators are shown in elevation.

Fig. 2 is an enlarged vertical cross-sectional view of the spraying device used in our process.

Fig. 3 is a horizontal cross-sectional view of the spraying device taken on the line 3—3 of Fig. 2, and, Fig. 4 is a bottom plan view of the angular valve of the spraying device—the hollow shaft being shown in cross section.

Referring to the drawings, 1 represents vacuum evaporators or other containers in which a solution of urea, calcium nitrate or other fusible material is evaporated to such a concentration that its content of water is reduced to 10 per cent or less. The evaporators are connected at the bottom through the valves 2, the steam-jacketed pipe 3 and the flanged T 4 with a common outlet pipe 5.

The pipe 5 opens into the spraying device 6 which is centrally located at the top of the spraying chamber 7. The lower portion of the spraying chamber is constructed in the form of a series of hoppers 8 in annular arrangement about the pipe 9. The walls of the hoppers converge downwardly and the lower end of each is provided with a spout 10 and a valve 11 of any suitable design.

Circulation of air through the spraying chamber is secured by means of a fan 12 which continuously withdraws air at ordinary temperature and pressure through the inlet 13, or treated air from a conditioning system, not shown, through the inlet 14, according as the two-way valve 15 is set to receive one or the other, and forces it through the pipe 9, the spraying chamber 7 and the exit openings 16.

The spraying device as shown in the cross-sectional views of Figs. 2, 3 and 4, consists of a rotatable cylinder 17 mounted on a hollow shaft 18 which is provided with a collar 19 and is supported within the cast iron bushing 20 by the thrust bearing 21 and the roller bearing 22.

The cylinder is mounted on the shaft by threaded connection through the tapped boss 23. The portion of the shaft which extends within the cylinder is slotted vertically to form the segmented annular sections 24. These slots serve as guides for the cross-arms 25 of the annular shaped float 26 which is free to move up and down within the cylinder. A connecting rod 27 which is mounted on the float 26 supports a 60 degree angular valve 28 within the hollow shaft 18. The lower end of the outlet pipe 5, which dips into the hollow shaft 18, is beveled at 29 to serve as a seat for the valve 28. The latter is held in a central position by the rim 30 which is grooved in a vertical direction to form openings 31 for the free passage of liquid through the shaft.

The cylinder of the spraying device may be conveniently constructed in two sections which are held together at their flanged edges 32 by machine bolts 33. This arrangement of parts offers the advantages that it provides an apparatus of simple construction and one that can be readily disassembled for cleaning or repair.

The lower section of the cylinder is provided with equally spaced perforations 34 which extend in one or more horizontal rows around the cylinder. The desired speed of rotation of the cylinder around its axis is secured by the variable speed motor 35 which acts through the bevel gears 36.

In the operation of the process the material to be granulated is concentrated or fused in one of the evaporators while being sprayed from the other. The valve 2 at the bottom of the evaporator is then opened and the solution allowed to discharge by gravity flow through the pipe 5 into the hollow shaft and cylinder of the spraying device. In the construction of the apparatus the size and number of the perforations are so adjusted that the outflow from the rotating cylinder is less than the minimum unobstructed inflow through the pipe 5. The spraying device accordingly quickly fills with solution to the point where the float in the cylinder is buoyed up by a force which just balances the pressure on the valve 28 due to the head of solution at the outlet of pipe 5. As the inflow of solution from pipe 5 tends to increase or decrease the resulting rise and fall of the level of solution in the hollow shaft 18 brings about a corresponding rise and fall of the valve 28 which offsets any tendency to change in the volume of inflow. The purpose of the float and valve is thus to provide an automatic means for maintaining a uniform flow of solution through the apparatus throughout the period of spraying.

The rotation of the cylinder is adjusted to such a speed that the solution is broken up into small droplets by centrifugal force as it issues from the perforations of the cylinder in a horizontal direction. The droplets are congealed as they fall through the chamber by a counter-current flow of air and are collected in the hoppers 8 in the form of spherical particles of uniform size.

The size of the particles varies with the speed of rotation of the cylinder, the cross-sectional area of the individual perforations and with the density and surface tension of the solution sprayed. It has been found that when the speed of rotation of the cylinder and the size of the perforations are properly adjusted it is possible to spray a material so that 90 per cent will pass through a 20 mesh and be retained in a 30 mesh screen. Any change in the speed of rotation will be followed by a marked change in the uniformity of the sprayed particles.

If the material to be sprayed is of a hygroscopic nature it is necessary to reduce the relative humidity of the air in the spraying chamber below that corresponding to the vapor pressure of its saturated solution. This can be secured most economically by passing the air through a spray chamber operated in connection with a refrigerating plant to condense out the necessary amount of water. In the case of calcium nitrate, for example, the vapor pressure of its saturated solution corresponds to a relative humidity of 55 per cent at a temperature of 20° C. This means that calcium nitrate will deliquesce when exposed to air having a relative humidity above 55 per cent and it is therefore necessary to reduce the relative humidity of the air in the spraying chamber below this percentage when spraying a material of this kind.

The temperature to which the spraying water used in cooling the air must be reduced to give any desired relative humidity at a given temperature may be found by use of a psychrometric chart such as that given by W. H. Carrier in the Trans. Am. Soc. Mech. Engrs. 33, 1005 (1911). This chart shows that if it is desired to reduce the relative humidity of the air to, say, 45 per cent at 20° C., the temperature of the water used in the spray through which the air is passed must be reduced to 7° C. If the relative humidity of the air is already below 45 per cent no treatment is then necessary and ordinary air may then be introduced into the spraying chamber through the inlet 14.

While the foregoing description of the process of our invention refers particularly to the granulation of a fused material, it is to be understood that our invention is equally applicable for spraying the solution of a salt for the purpose of dehydrating it. When this is the object of the process hot instead of cold air should be drawn into the spraying chamber through the inlet 14, and the speed of rotation of the cylinder should be increased in order to reduce the size of the particles and thus insure more rapid dehydration of the sprayed material.

What we claim is:—

In an apparatus for granulating a fused material, a rotatable spraying device suspended vertically, including a hollow shaft, a perforated cylinder mounted on said hollow shaft, a float within the cylinder and a valve within the hollow shaft and mounted on said float for automatically controlling the inflow of the fused material into the spraying device at a rate equal to the outflow.

HARRY BRYAN.
WILLIAM H. ROSS.
JAMES RICHARD ADAMS.